United States Patent
Lee

(10) Patent No.: US 9,338,509 B2
(45) Date of Patent: May 10, 2016

(54) METHOD FOR OPERATING AN INTERACTIVE PROGRAM GUIDE, A USER DEVICE FOR AN INTERACTIVE PROGRAM GUIDE, A METHOD AND A DEVICE FOR PROVIDING A CONSOLIDATED DATA GUIDE INFORMATION LISTING

(75) Inventor: Su Zin Lee, Pyeongtaek-si (KR)

(73) Assignee: LG ELECTRONICS INC., Seoul (KR)

( * ) Notice: Subject to any disclaimer, the term of this patent is extended or adjusted under 35 U.S.C. 154(b) by 218 days.

(21) Appl. No.: 12/816,633

(22) Filed: Jun. 16, 2010

(65) Prior Publication Data

US 2011/0078734 A1    Mar. 31, 2011

(30) Foreign Application Priority Data

Sep. 29, 2009 (KR) ........................ 10-2009-0092265

(51) Int. Cl.

| G06F 3/00 | (2006.01) |
|---|---|
| G06F 13/00 | (2006.01) |
| H04N 5/445 | (2011.01) |
| H04N 21/462 | (2011.01) |
| H04N 21/431 | (2011.01) |
| H04N 21/482 | (2011.01) |

(52) U.S. Cl.
CPC ....... *H04N 21/4622* (2013.01); *H04N 21/4312* (2013.01); *H04N 21/4821* (2013.01)

(58) Field of Classification Search
CPC .......... H04N 21/4622; H04N 21/4312; H04N 21/4821
USPC ..................................................... 725/48, 49
See application file for complete search history.

(56) References Cited

U.S. PATENT DOCUMENTS

| 5,684,525 | A | 11/1997 | Klosterman |
| 5,828,945 | A | 10/1998 | Klosterman |
| 6,505,348 | B1 | 1/2003 | Knowles et al. |
| 6,993,782 | B1 * | 1/2006 | Newberry et al. ............. 725/39 |
| 7,240,356 | B2 * | 7/2007 | Iki et al. .......................... 725/48 |
| 7,496,946 | B1 * | 2/2009 | Wehmeyer et al. ............ 725/59 |
| 7,546,623 | B2 * | 6/2009 | Ramraz et al. .................. 725/48 |
| 7,644,428 | B2 * | 1/2010 | Akiyama ........................ 725/49 |
| 8,522,281 | B1 * | 8/2013 | Sahami et al. .................. 725/48 |
| 2005/0155063 | A1 * | 7/2005 | Bayrakeri et al. ............. 725/47 |
| 2006/0123449 | A1 | 6/2006 | Ma et al. |
| 2006/0150214 | A1 | 7/2006 | Ramraz et al. |
| 2006/0161951 | A1 | 7/2006 | Hindle et al. |
| 2006/0259926 | A1 * | 11/2006 | Scheelke et al. ................ 725/48 |
| 2007/0277207 | A1 * | 11/2007 | Yun et al. ...................... 725/109 |
| 2007/0288960 | A1 | 12/2007 | Akiyama |
| 2008/0101760 | A1 | 5/2008 | Waller |

(Continued)

FOREIGN PATENT DOCUMENTS

| CN | 101087379 A | 12/2007 |
| CN | 100397899 C | 6/2008 |

(Continued)

*Primary Examiner* — Oschta Montoya
(74) *Attorney, Agent, or Firm* — Birch, Stewart, Kolasch & Birch, LLP

(57) ABSTRACT

A method for displaying an interactive program guide, a user device for an interactive program guide, a method and device for providing a consolidated data guide information listing. A receiver is configured to receive individual data guide information from at least two information sources. A controller is configured to combine the received individual data guide information to form a consolidated data guide information listing and to output the consolidated data guide information listing. A displayer is configured to generate a display of at least a portion of the consolidated data guide information listing output to the controller.

14 Claims, 11 Drawing Sheets

| | 1310 | 1320 | 1331 | 1330 | | 1332 | 1341 | 1340 | | 1342 |
|---|---|---|---|---|---|---|---|---|---|---|
| | AIR | CAB | ◁ 7-1 | 8-1 | 9-1 | 11-1 ▷ | ◁ 20-1 | 30-1 | 40-1 | 50-1 ▷ |
| | | 8:00 | Carton | Love Actually.. | MBC News | BiBiBo | Math(Sta..) | Romantic Holiday | Propose | Friends(1) |
| 1350 | | 9:00 | Flower | | Sole | Style | Eng.(Verb) | | Nine | Friends(2) |
| 1351 | | 10:00 ▽ | News | Rabbit | Friends | Queen | Q&A | Innocent | Rain | Friends(3) |

(56) References Cited

U.S. PATENT DOCUMENTS

| | | | |
|---|---|---|---|
| 2008/0235728 A1* | 9/2008 | Kim | 725/39 |
| 2009/0094646 A1* | 4/2009 | Walter et al. | 725/48 |
| 2009/0204995 A1 | 8/2009 | Kang et al. | |
| 2011/0035441 A1 | 2/2011 | Osuga | |

FOREIGN PATENT DOCUMENTS

| | | |
|---|---|---|
| CN | 101237539 A | 8/2008 |
| EP | 1 802 109 A2 | 6/2007 |
| EP | 1986435 A1 | 10/2008 |
| JP | 2001-8124 A | 1/2001 |
| JP | 2007-329649 A | 12/2007 |
| JP | 2008-118654 A | 5/2008 |
| JP | 2008-245275 A | 10/2008 |
| KR | 10-2009-0036386 A | 4/2009 |
| WO | WO 2008/008341 A2 | 1/2008 |
| WO | WO 2009/054652 A1 | 4/2009 |
| WO | WO 2009/113371 A1 | 9/2009 |

\* cited by examiner

FIG. 8

| CP | Netflix | Yahoo | YouTube | VuDu |
|---|---|---|---|---|
| 8:00 | AAA | DDD | B'BB | AA'A |
| 9:00 | BBB |  | A'AA | C"CC |
| 10:00 | CCC | B'BB | C'CC | B'B'B |

FIG. 9

| AIR | 7-1 | 8-1 | 9-1 | 11-1 |
|---|---|---|---|---|
| 8:00 | Carton | Love Actually.. | MBC News | BiBiBo |
| 9:00 | Flower |  | Sole | Style |
| 10:00 | News | Rabbit | Friends | Queen |

FIG. 10

| CAB | ◁ 20-1 | 30-1 | 40-1 | 50-1 ▷ |
|---|---|---|---|---|
| 8:00 | Math(Sta..) | Romantic Holiday | Propose | Friends(1) |
| 9:00 | Eng.(Verb) | | Nine | Friends(2) |
| 10:00 ▽ | Q&A | Innocent | Rain | Friends(3) |

FIG. 11

| SAT | ◁ 20-1 | 30-1 | 40-1 | 50-1 ▷ |
|---|---|---|---|---|
| 8:00 | Math(Sta..) | Romantic Holiday | Propose | Friends(1) |
| 9:00 | Eng.(Verb) | | Nine | Friends(2) |
| 10:00 ▽ | Q&A | Innocent | Rain | Friends(3) |

FIG. 12

| CP | ◁ Netflix | Yahoo | YouTube | VuDu ▷ |
|---|---|---|---|---|
| △ | VOD | VOD | UCC | VOD |
| | Music | Weather | Music | TV on demand |
| ▽ | TV on demand | Search | Search | Search |

METHOD FOR OPERATING AN INTERACTIVE PROGRAM GUIDE, A USER DEVICE FOR AN INTERACTIVE PROGRAM GUIDE, A METHOD AND A DEVICE FOR PROVIDING A CONSOLIDATED DATA GUIDE INFORMATION LISTING

This application claims the benefit of Korean Patent Application No. 10-2009-0092265, filed on Sep. 29, 2009 which is hereby incorporated by reference as if fully set forth herein.

BACKGROUND OF THE INVENTION

1. Field of the Invention

The present invention relates to a method for displaying an interactive program guide, a user device for an interactive program guide, a method and device for providing a consolidated data guide information listing and, more particularly, to a method and device for displaying guide information on a broadcast service based upon a user request, and a method and device for receiving data from multiple providers, thereby providing consolidated data guide information.

2. Discussion of the Related Art

The related art broadcast receiver transmits contents produced by each broadcast company through a radio wave propagation medium, such as groundwave (or terrestrial), cable or satellite broadcasting. And, the user is provided with the contents service by viewing the transmitted contents through a receiver that can receive each transmission medium.

However, as the digital-based digital broadcasting technology been under development and commonly used as compared to the conventional analog broadcasting, diverse types of contents services, such as real-time broadcasting, CoD (Contents on Demand), games, news, and so on, have become available for service to users through an internet network connected to each household, apart from the conventional radio wave or wired cable media.

An exemplary provision of a contents service using the internet network may include an IPTV (Internet Protocol TV). The ITPV refers to transmitting diverse information service, moving picture contents and broadcast programs by using the internet network, thereby providing the transmitted contents to a receiver of the user. The internet network may be realized within various types of network based upon an IP (Internet Protocol), such as an optical cable network, a coaxial cable network, a FTTH (Fiber To The Home), telephone network, wireless (or radio) network, and so on.

In case of a service using the above-described internet network, unlike the general groundwave (or terrestrial) broadcasting, a bi-directional (or two-way) characteristic may be added, and the user may be able to view (or watch) a wanted (or desired) contents service at his or her convenient time.

SUMMARY OF THE INVENTION

An object of the present invention devised to solve the problem lies on providing a method for displaying an interactive program guide, a user device for an interactive program guide, a method and device for providing a consolidated data guide information listing, wherein the interactive program guide provides users with guide information on a broadcast service being transmitted from diverse transmission media.

Another object of the present invention devised to solve the problem lies on providing a method for displaying an interactive program guide, a user device for an interactive program guide, a method and device for providing a consolidated data guide information listing, wherein the user can easily and conveniently verify the guide information on the broadcast service being transmitted from diverse transmission media.

The technical objectives that are to be realized by the present invention will not be limited only to the technical objects pointed out herein. Other technical objectives that have not yet been mentioned herein will become apparent to those having ordinary skill in the art upon examination of the following or may be learned from practice of the invention.

In order to achieve the object of the present invention, a method for displaying an interactive program guide comprises displaying a first screen region including at least one source option associated with a source for which program schedule information is available, receiving a source option selected from the at least one source option, and displaying a second screen region including the program schedule information associated with the selected source option.

Preferably, the first screen region may display at least one source mark indicating a source.

Preferably, the method for displaying an interactive program guide may further include receiving program schedule information on a source associated with the selected source option.

Preferably, the program schedule information may be received from a source other than the associated source.

Preferably, the displaying the second screen region includes displaying at least one portion of the program schedule information on the second screen region according to the selected source option.

Preferably, at least one source region may be displayed on a portion of the first screen region.

In order to achieve another object of the present invention, in a user device displaying an interactive program guide including a controller, a remote controller, and a displayer, the controller controls the displayer to display a first screen region including a plurality of source options each associated with a source for which program schedule information is available, the plurality of source options simultaneously indicating a plurality of corresponding sources for which program schedule information is available, the remote controller generates a user control command associated with a user selection of a specific source option among the plurality of source options, and transmits the generated user control command, and the controller receives the transmitted user control command and controls the displayer to display a second screen region based upon the received user command, the second screen region including program schedule information associated with the selected source option.

In order to achieve yet another object of the present invention, a method for providing a consolidated data guide information listing comprises receiving individual data guide information from at least two information sources, combining the received individual data guide information to form a consolidated data guide information listing, providing the consolidated data guide information listing to a displayer, wherein the consolidated data guide information listing provided to the displayer includes program listings for at least two data providing sources, and generating a display of at least a portion of the consolidated data guide information listing.

Preferably, the information source may be a multi service provider.

Preferably, the multi service provider may include at least one of YAHOO, NETFLIX, YOUTUBE, AND VUDU.

Preferably, the method for providing a consolidated data guide information listing further includes receiving a user control command selecting a specific data providing source from the at least two data providing sources.

Preferably, the receiving the individual data guide information includes receiving the individual data guide information based upon a user service-usage habit.

In order to achieve yet another object of the present invention, a device for providing a consolidated data guide information listing comprises a receiver configured to receive individual data guide information from at least two information sources, a controller configured to combine the received individual data guide information to form a consolidated data guide information listing, and to output the consolidated data guide information listing, wherein the consolidated data guide information listing output from the controller includes program listings for at least two data providing sources, and a displayer configured to generate a display of at least a portion of the consolidated data guide information listing output from the controller.

Preferably, the information source may be a multi service provider.

Preferably, the multi service provider may include at least one of YAHOO, NETFLIX, YOUTUBE, AND VUDU.

Preferably, the controller may receive a user control command selecting a specific data providing source from the at least two data providing sources.

Preferably, the controller may receive the individual data guide information based upon a user service-usage habit.

Preferably, the receiver may include a tuner configured to tune a broadcast signal including individual data guide information, and a network interface unit configured to receive an Internet Protocol (IP) packet including individual data guide information, the IP packet being transmitted through the internet.

Preferably, the generated display screen may include at least one source option associated with a source for which the individual data guide information is available.

Preferably, the device for providing a consolidated data guide information listing may further include a demodulator configured to demodulate the tuned broadcast signal, a parser configured to parse the received IP Packet to extract the individual data guide information, a multiplexer configured to multiplex the demodulated broadcast signal and the extracted individual data guide information, and a demultiplexer configured to demultiplex the multiplexed broadcast signal and the extracted individual data guide information and output the demultiplexed data to the controller.

According to the method for displaying an interactive program guide, the user device for an interactive program guide, the method and device for providing a consolidated data guide information listing of the present invention, since guide information being transmitted through diverse transmission media are combine and provided to the user in a consolidated form, the user may be capable of easily and conveniently selecting a broadcast service being transmitted through diverse transmission media without any separate settings or change in modes.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 8 illustrates an exemplary guide information displayed on a screen according to the present invention, FIG. 9 illustrates another exemplary guide information displayed on a screen according to the present invention, FIG. 10 illustrates yet another an exemplary guide information displayed on a screen according to the present invention, FIG. 11 illustrates yet another an exemplary guide information displayed on a screen according to the present invention, FIG. 12 illustrates yet another an exemplary guide information displayed on a screen according to the present invention.

DETAILED DESCRIPTION OF THE INVENTION

Figure 1:
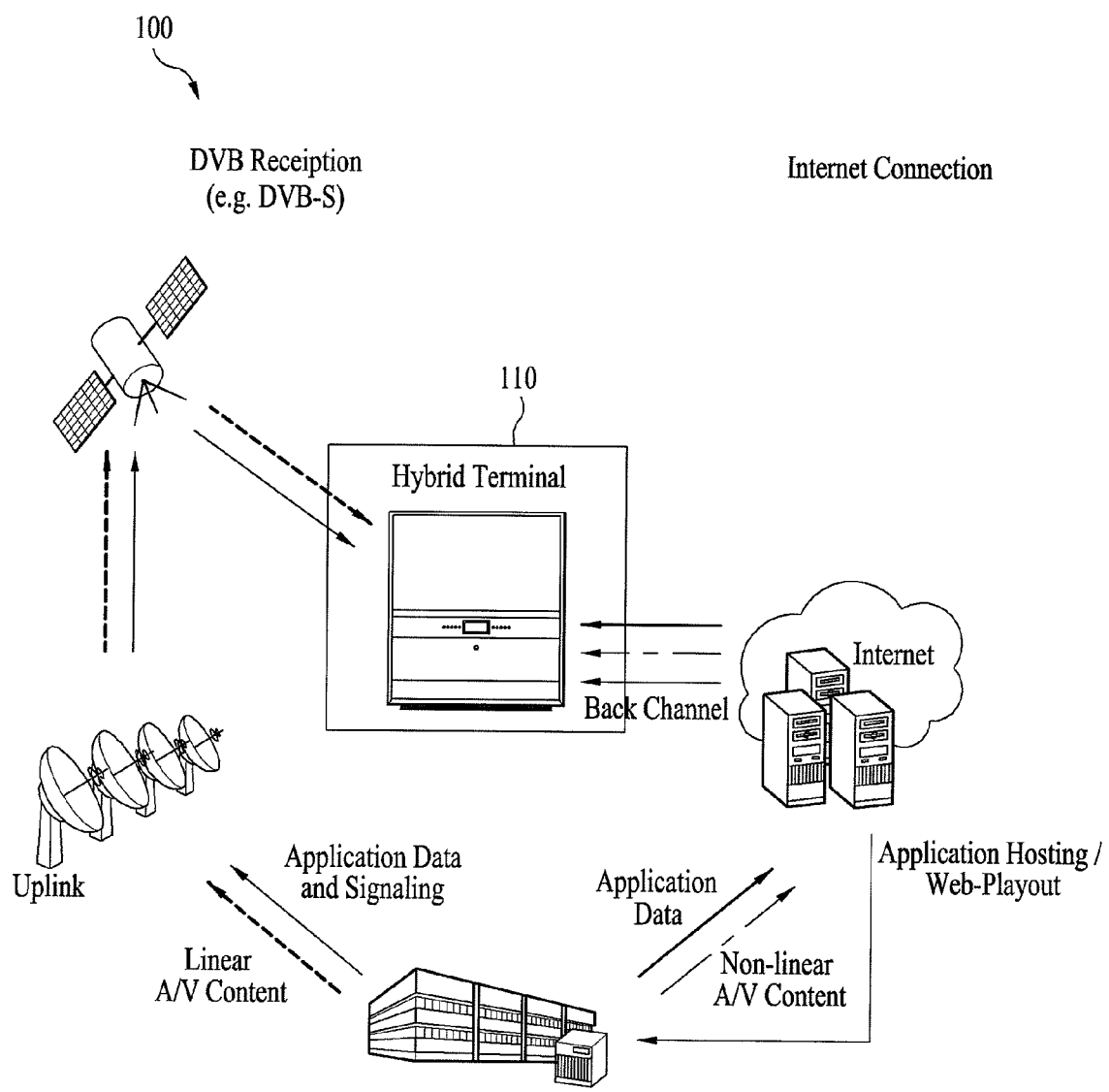
FIG. 1 illustrates a block view of an imaging system according to a preferred embodiment of the present invention.

Reference will now be made in detail to the preferred embodiments of the present invention, examples of which are illustrated in the accompanying drawings. It is to be understood that both the foregoing general description and the following detailed description of the present invention are exemplary and explanatory and are intended to provide further explanation of the invention as claimed. Furthermore, it is to be understood that the technical spirit and the fundamental structure and operation of the present invention will not be limited to the description of the present invention.

In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that terms used in the present invention should be defined, not simply by the actual terms used but by the meaning of each term lying within and also based upon the overall content of the description of the present invention.

A digital broadcast receiver refers to a broadcast receiver that can receive digital broadcast programs that as transmitted as digital video (or image) and audio (or voice) signals. Herein, a digital broadcast program refers to a broadcasting technique with two-way management, playback, and accumulation functions. This is because, unlike in the conventional analog broadcasting, television signals are compressed and transmitted in a digital format, wherein information (or data) signals are encoded and recorded. As compared to analog broadcasting, digital broadcasting is more robust to noise and has a low data damage rate. And, since separate error correction information is transmitted, the digital broadcasting is more advantageous in error correction. Also, digital broadcasting provides higher resolution and a sharper and more vivid image display. Furthermore, unlike in the analog broadcasting, a two-way service, wherein a broadcast service may be received from the broadcasting station, and wherein information may be provided to the broadcasting station, is available in digital broadcasting.

In the present invention, the term "digital broadcast program" is used as a concept including broadcast programs being transmitted via groundwave (or terrestrial), satellite, and cable and also broadcast programs being transmitted via internet networks. More specifically, a digital broadcast program is defined as a concept including IP (Internet Protocol) broadcast programs.

Also, in the present invention, a digital broadcast receiver includes a broadcast receiver that can provide users with internet services. Herein, internet services refers to services that can be provided via the internet, such as CoD (Content's on Demand) services, YOUTUBE services, information services including weather forecasts, news, regional information, search services, and so on, entertainment services including games, karaoke services, and so on, and communication services including TV mailing services, TV SMS (Short Message Services), and so on. Accordingly, in the present invention, digital broadcast receivers include network TVs, web TVs, and broadband TVs. Also, broadcast services may include broadcast services being provided via groundwave (or terrestrial), satellite, and cable and may also include internet services.

Also, in the present invention, a digital broadcast receiver may include a broadcast receiver that can receive broadcast data from one or more sources. Herein, a source refers to a transmission medium transmitting broadcast data. For example, a source includes a groundwave (or terrestrial), satellite, cable, and internet line (or wire). More specifically, in the present invention, the digital broadcast receiver may receive broadcast data from at least any one of groundwave (or terrestrial), satellite, cable, and internet line (or wire).

FIG. 1 illustrates a block view of an imaging system according to a preferred embodiment of the present invention.

Referring to FIG. 1, an imaging system (100) includes a Broadcaster, an Application Provider, an Application hosting/Web-Playout server, and a digital broadcast receiver (110). Also, the imaging system (100) may include a satellite network, an internet network, a cable network, a groundwave (or terrestrial) network for data transmission.

The Broadcaster and the Application Provider may correspond to an information source or a data providing source. Herein, an information source corresponds to a server providing guide information on a broadcast service. An example of the information source may be a multi-service provider. A multi-service provider may include at least any one of YAHOO, NETFLIX, YOUTUBE, AND VUDU. Furthermore, a data providing source may correspond to a server providing broadcast services. When providing broadcast services, YAHOO, NETFLIX, YOUTUBE, AND VUDU may also be data providing sources.

The Broadcaster provides Linear (or Real-time) Audio/Video Content. Also, the Broadcaster may transmit Application data associated with the Linear Audio/Video Content, and the Broadcaster may also transmit Signaling data for signaling the Linear Audio/Video Content. The Broadcaster may transmit the Linear Audio/Video Content, the Application data, and the Signaling data via a satellite network. In this case, the Broadcaster may transmit the Linear Audio/Video Content, the Application data, and the Signaling data according to the DVB-S/S2 standard. Herein, in addition to the satellite network, the Broadcaster may also transmit the Linear Audio/Video Content, the Application data, and the Signaling data via a groundwave (or terrestrial) network, a cable network, and an internet network. In this case, the Linear Audio/Video Content, the Application data, and the Signaling data may be transmitted according to the DVB-T/T2 and DVB-C standards.

The Application Provider provides a Non-linear (or Non-real time) A/V Content and Application Data. The Application Provider may provide the Non-linear A/V Content and Application Data to the Application hosting/Web-Playout server by using a backbone network. And, the Application Provider may provide the Non-linear A/V Content and Application Data to the digital broadcast receiver (110) by using an internet network.

Herein, the Broadcaster and the Application Provider have been described individually. However, the Broadcaster and the Application Provider will not be limited to the above description and may also be implemented by a single service provider or a single server. More specifically, a single server may correspond to the Broadcaster and the Application Provider.

The Application hosting/Web-Playout server stores the A/V content and Application data provided from the Application Provider. Also, the Application hosting/Web-Playout server may transmit the A/V content and Application data to the digital broadcast receiver (110) using a uni-cast, multi-cast, and broadcast method. And, the Application hosting/Web-Playout server may transmit the A/V content and Application data to the digital broadcast receiver (110) through an internet network. Furthermore, the Application hosting/Web-Playout server may receive a request or client (or user) information from the digital broadcast receiver (110) through a Back Channel.

The Application hosting/Web-Playout server provides an Application hosting service and a Web-Playout service to the digital broadcast receiver (110). By using the Application hosting service, the digital broadcast receiver (110) may be served with an application, which can be used by executing the internet without having to store a separate set of application data, from the Application hosting/Web-Playout server. More specifically, the digital broadcast receiver (110) may use the application being executed by the Application hosting/Web-Playout server as a local application. Also, the digital broadcast receiver (110) may store content files, application files, data files, and so on in the Application hosting/Web-Playout server and not in the digital broadcast receiver (110). The Application hosting/Web-Playout server may transmit an execution screen of the application being executed by the digital broadcast receiver (110) to a web page, and the digital broadcast receiver (110) may display the transmitted web page on a display screen.

The digital broadcast receiver (110) may receive the Linear A/V Contents, Application data, and Signaling data provided from the Broadcaster. The digital broadcast receiver (110) may also receive the Non-linear A/V Contents provided from the Application hosting/Web-Playout server. And, the application may be executed from the Application hosting/Web-Playout server. And, then, the digital broadcast receiver (110) may receive the execution result through a web page, thereby displaying the received execution result. More specifically, the digital broadcast receiver (110) may also be a Hybrid Terminal that can simultaneously receive the Linear A/V Contents provided from the Broadcaster and the Non-linear A/V Contents provided from the Application provider.

Also, the digital broadcast receiver (110) may transmit an application execution request and other requests to the Application hosting/Web-Playout server through a back channel. Additionally, depending upon the request made by the Application hosting/Web-Playout server or the application provider, the digital broadcast receiver (110) may provide client (or user) information and viewing information to the Application hosting/Web-Playout server or the application provider through the back channel.

Figure 2:
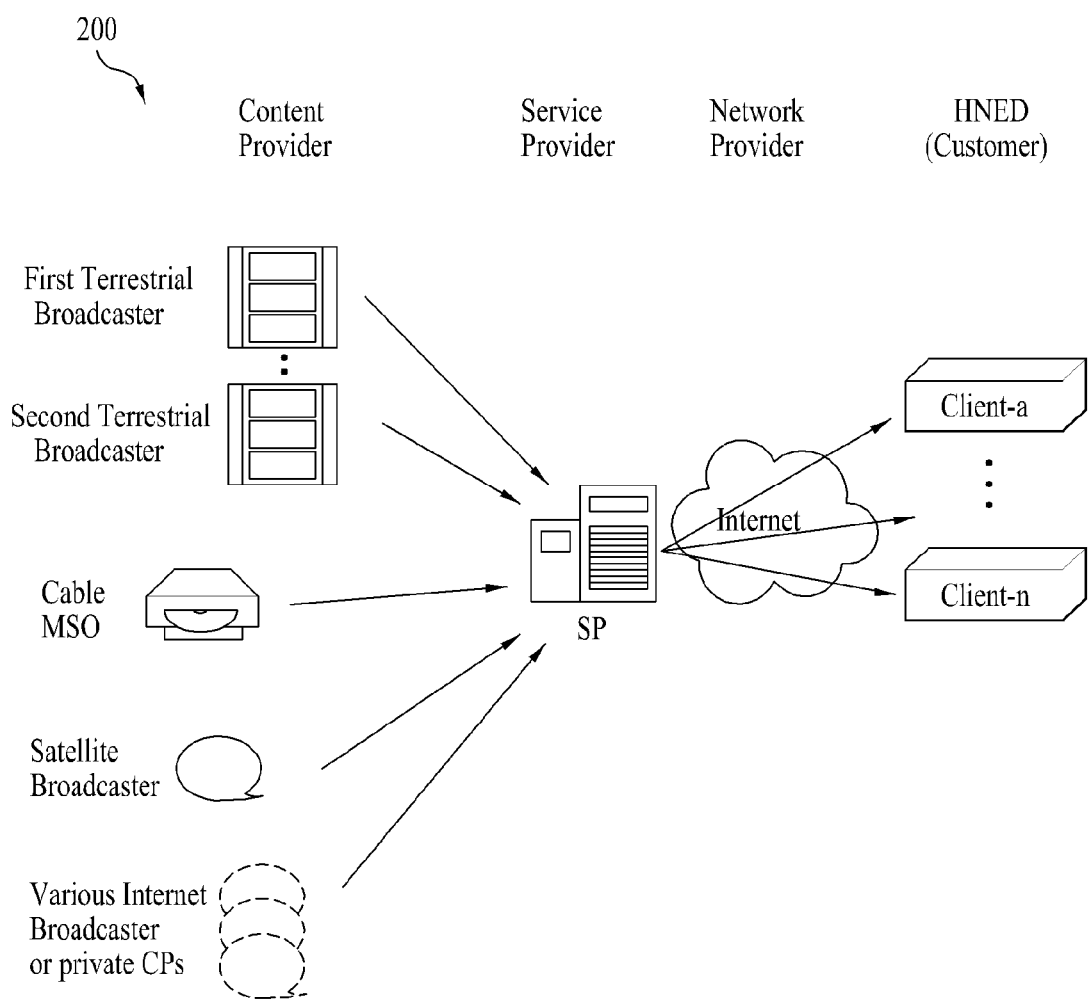
FIG. 2 illustrates a block view of an imaging system according to another preferred embodiment of the present invention.

FIG. 2 illustrates a block view of an imaging system according to another preferred embodiment of the present invention.

Referring to FIG. 2, as a system that can provide diverse contents using the internet network, an imaging system (200) may broadly consist of a Server and a network, and a broadcast receiver (or client).

The server may consist of servers performing a variety of functions, such as a Service Discovery and Selection server, a Streaming server, a Contents Guide information server, client (or user) information server, a payment server, and so on.

The server transmits moving picture data encoded in MPEG (Moving Picture Experts Group)2, MPEG4, and so on formats to the user through a network. Herein, an RTP (Real-Time Transport Protocol), an RTCP (RTP Control Protocol), and so on may be used as the protocol for transmitting the moving picture data.

When using the RTSP (Real-Time Streaming Protocol) as the protocol for transmitting moving picture, the receiver may control the moving picture stream play by using a function referred to as a network Trick Play, such as Pause, Replay, Stop, and so on.

The Contents Guide information server corresponds to a server providing information on the diverse contents that are being provided. As information corresponding to EPG (Electronic Program Guide) information, the Contents Guide information includes diverse information on the contents. Contents Guide information data are stored in the Contents Guide information server, and the Contents Guide information server provides the stored data to the broadcast receiver.

The information server related to Service Discovery and Selection provides the receiver with access information and Play (or playback) information with respect to servers that provide various contents services, such as broadcast programs, CoD (Contents on Demand), games, and so on.

The network system consists of an internet-based network and gateways. An optical network, a coaxial network, an FTTH (Fiber To The Home) network, a telephone network, a wireless network, and so on, may be used as the internet-based network based upon an IP. And, the gateway may perform general data transport (or delivery) as well as multicast group management using protocols, such as an IGMP (Internet Group Management Protocol), and QoS (Quality of Service) management.

The broadcast receiver refers to a broadcast receiver that can receive data being transmitted through an internet network and that can provide the received data to the user. Examples of the broadcast receiver include an IPTV Settop, a Homenet Gateway, an IPTV embedded TV, and so on.

In case of a hybrid type IPTV system, diverse conventional broadcasting contents as well as diverse internet contents may be provided. More specifically, the hybrid type IPTV system may provide diverse broadcasting contents, such as terrestrial broadcast programs, cable broadcast programs, satellite broadcast programs, and private broadcast programs, diverse internet moving picture contents, and other data contents apart from moving pictures to the user. And, the contents may be provided in real-time and may also be provided on-demand based upon a user request.

In the aspect of providing contents service, the imaging system (200) may be divided into a Content Provider (CP), a Service Provider (SP), a Network Provider (NP), and a user.

The Content Provider produces and provides divers contents. As shown in FIG. 2, Content Providers may include a terrestrial broadcaster, a cable SO (System Operator) or MSO (Multiple System Operator), satellite broadcaster, an Internet broadcaster, and so on.

The Service Provider service-packetizes the contents provided by the Contents Provider, as described above, and provides the processed contents. For example, the Service provider of FIG. 1 packetizes a first terrestrial broadcast program, a second terrestrial broadcast program, a cable MSP, a satellite broadcast program, diverse internet broadcast programs, and so on, and provides the packetized programs to the user.

The Network Provider provides a network for providing the service to the user. The user may also build a Home Network End User (HNED) so as to be provided with the service.

As a means for protecting contents being transmitted from IPTV system, as described above, Conditional Access, Content Protection, and so on may be used. As an example for performing the above-mentioned Conditional Access and Content Protection, a CableCARD method, a DCAS (Downloadable Conditional Access System) method may be used.

Figure 3:
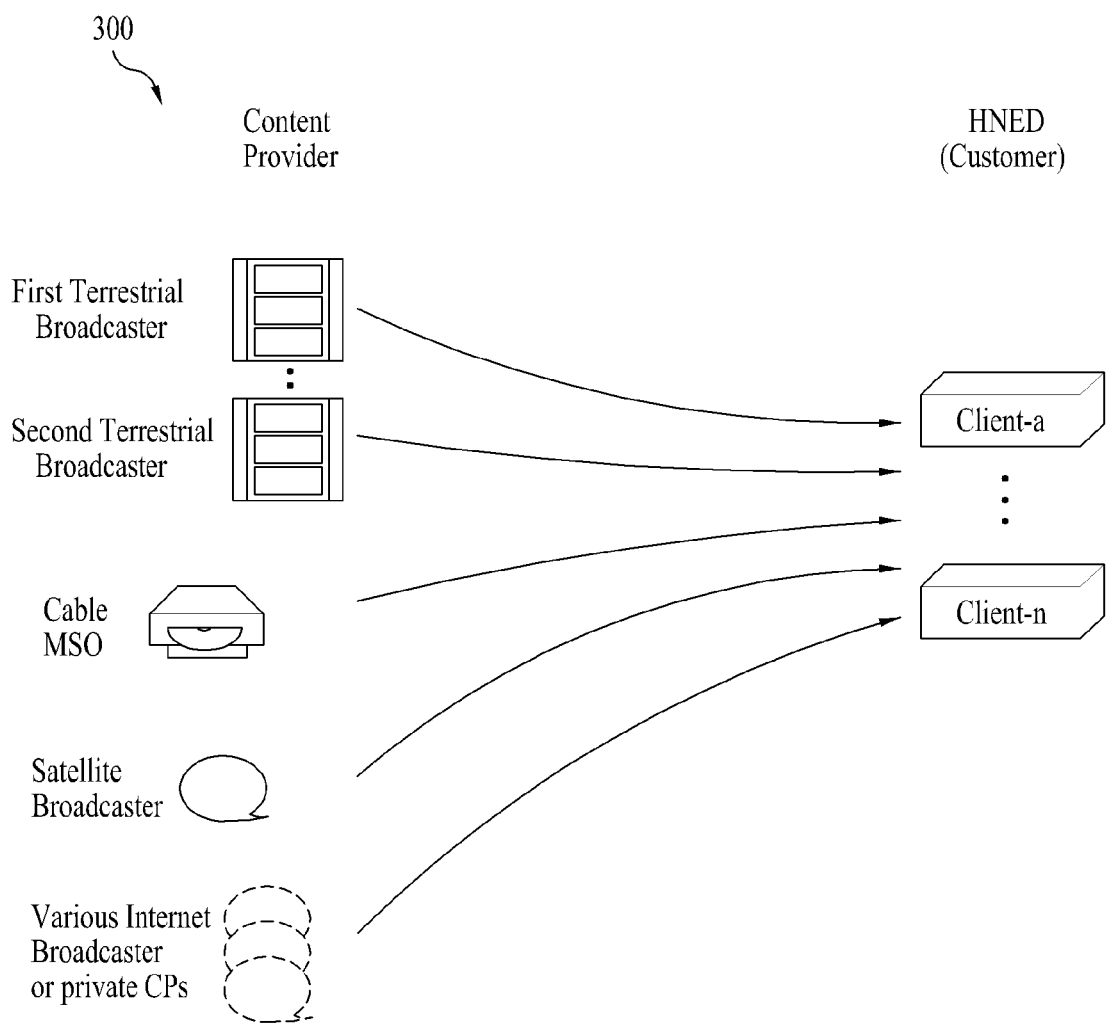
FIG. 3 illustrates a block view of an imaging system according to yet another preferred embodiment of the present invention.

FIG. 3 illustrates a block view of an imaging system according to yet another preferred embodiment of the present invention.

Referring to FIG. 3, an imaging system (300) includes a Content Provider (CP) and a receiver (or Client). Herein, the receiver may be a network TV. The network TV may receive digital broadcast programs, the network TV may also be a digital broadcast receiver that can receive internet services, thereby providing the received internet services to the viewer (or user). The network TV includes broadband TVs, web TVs, and HbbTVs. Herein, the web TV is a digital broadcast receiver that can receive and provide internet services via web base. The HbbTV is a combination of the broadband TV and the IPTV. More specifically, the HbbTV refers to a receiver that can receive broadcast data via groundwave, cable, satellite, and internet lines.

A network TV may receive an internet service directly from the contents provider through the internet. The network TV may request a search for information required from the contents provider and may receive the search result, thereby providing the received search result to the user. Also, the network TV may download contents and software requested by the user, and the network TV may also play the downloaded contents or execute the downloaded software. Furthermore, the network TV may receive a web page from the contents provider and may display the received web page through a web browser.

Additionally, the network TV may not only receive broadcast services through the internet but may also receive a broadcast service from a terrestrial broadcaster via groundwave. The network TV may also receive broadcast services from a cable SO (System Operator) or an MSO (Multiple System Operator) via cable and may also receive broadcast services from a satellite broadcaster via satellite.

The digital broadcast receiver may use a unicast or multicast method so as receive a broadcast service from a service provider or a contents provider.

Figure 4:
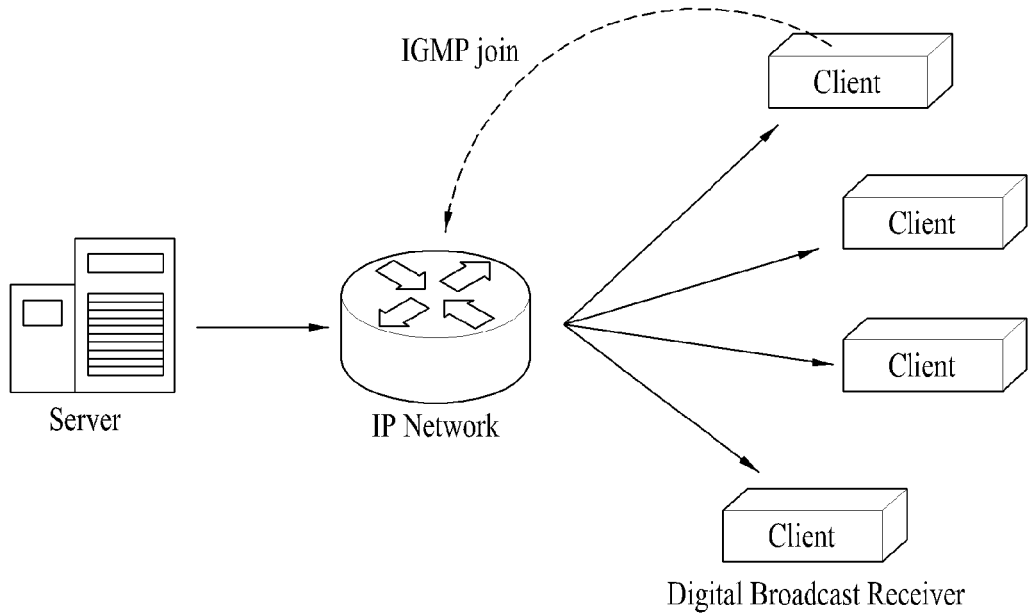
FIG. 4 illustrates a broad view of a multi-cast method.
Figure 5:
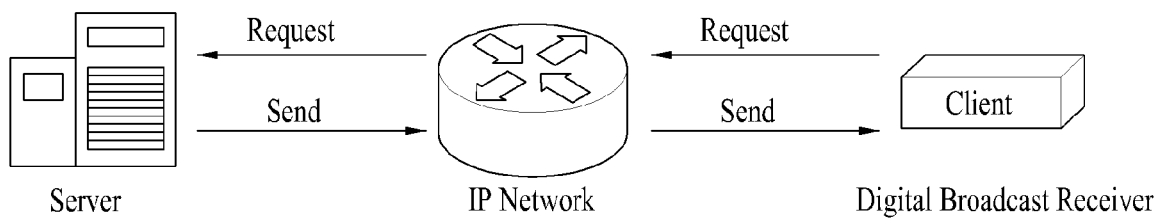
FIG. 5 illustrates a broad view of a uni-cast method.

FIG. 4 and FIG. 5 respectively illustrate a broad view of a multicast method and a unicast method.

Referring to FIG. 4 and FIG. 5, the unicast method corresponds to a method of performing a 1:1 transmission between one transmitter and one receiver. For example, in case of the unicast method, when the receiver sends a request for data to the server, the server transmits data to the receiver in accordance with the received request. The multicast method corresponds to a method of transmitting data to a specific group of multiple receivers. For example, the server may simultaneously transmit data to multiple pre-registered receivers. In order to register the multicast, protocols such as an IGMP (Internet Group Management Protocol) may be used.

Figure 6:
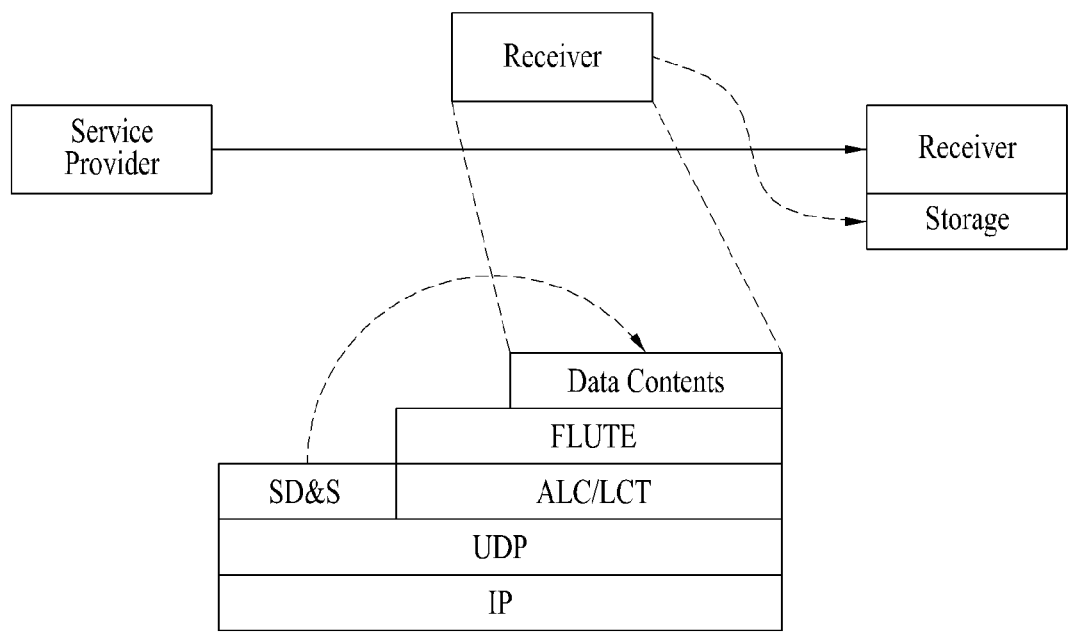
FIG. 6 illustrates a hierarchical structure for broadcasting a Content Download Service (CDS) according to an embodiment of the present invention.

FIG. 6 illustrates a hierarchical structure for a content download service (CDS) of IPTV.

Referring to FIG. 6, the service provider transmits CDS-specific Data Contents to the IPTV receiver by using the transport protocol. The transmitted CDS-specific Data Contents are stored in the storage of the IPTV. Herein, a FLUTE (File Delivery over Uni-directional Transport) loaded on the ALC/LCT on the IP/UDP may be used as the transport protocol, and a DVB-STP, a DVB data/object carousel, an FTP (File Transfer Protocol), an HTTP (hypertext transfer protocol), and so on may also be used as the transport protocol. And, other transport protocols may also be used as the above-mentioned protocols.

When using the FLUTE as the transport protocol, the presence or absence of a CDS service may be notified to the IPTV receiver through a Service Discovery and Selection (SD&S), and details on the contents may be discovered (or found) through TV Anytime format metadata.

The CDS-specific Data Contents may include various types of contents, such as A/V contents, data contents, game contents, and so on.

As described above, the digital broadcast receiver according to the present invention, including IPTVs, may be provided with diverse contents, and the provided contents may be outputted to a display screen in accordance with the user's selection (or choice).

Figure 7:
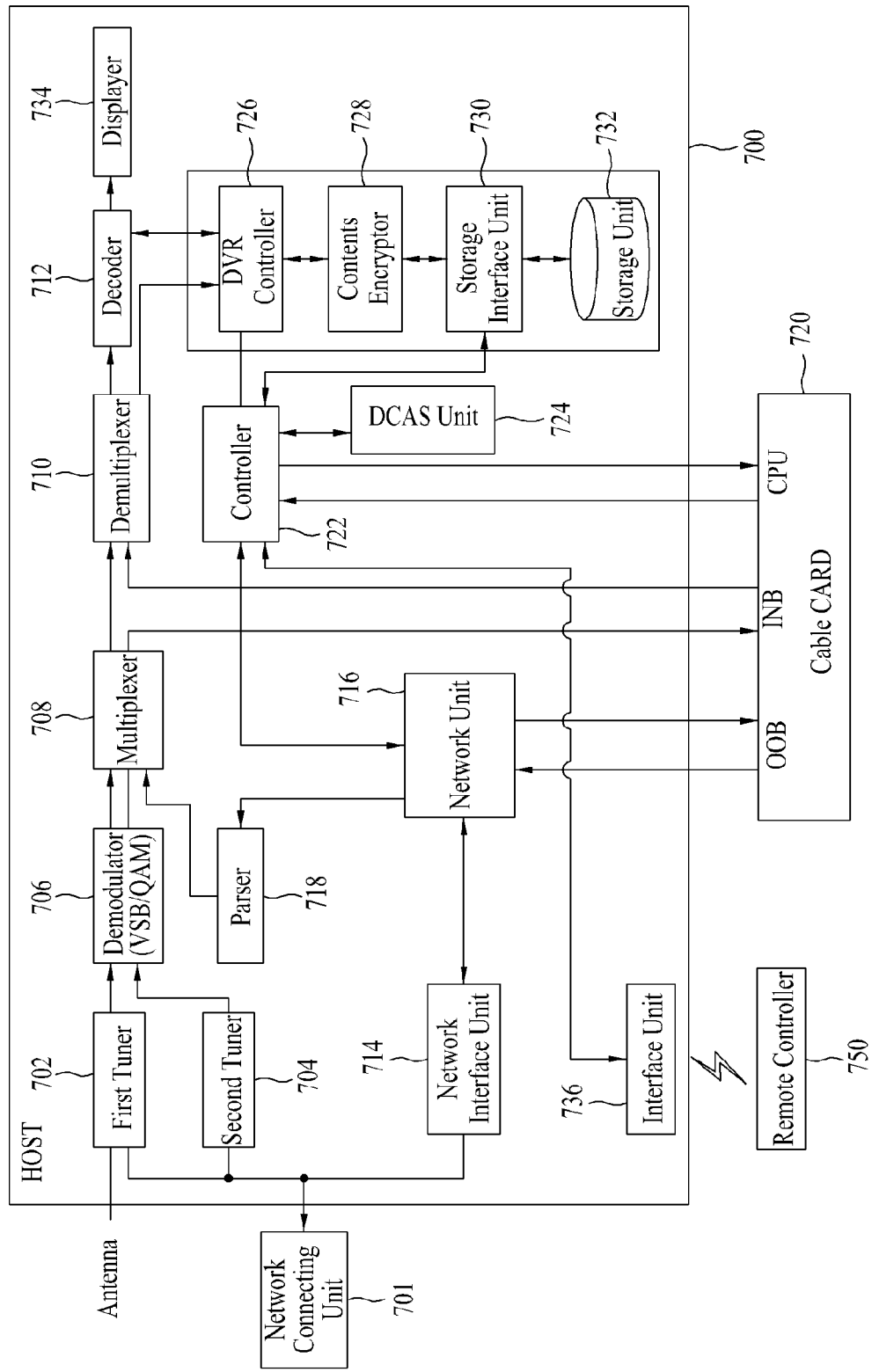
FIG. 7 illustrates a block view of a digital broadcast receiver according to a preferred embodiment of the present invention.

FIG. 7 illustrates a block view of a digital broadcast receiver according to a preferred embodiment of the present invention.

Referring to FIG. 7, the digital broadcast receiver of FIG. 7 represents a form of receiver that can receive all IP-based IPTV services, cable broadcast programs, groundwave (or terrestrial) broadcast programs, satellite broadcast programs, and internet services, so on. Depending upon its embodiment, the receiver of FIG. 7 may only receive IPTV services, or may receive only cable broadcast programs, or may receive only internet services and cable broadcast programs. Additionally, depending upon the embodiment of the receiver, the CableCARD of FIG. 7 may also be referred to as a term other than CableCARD.

The digital broadcast receiver of FIG. 7 may include a HOST (700) and a CableCARD (720). Unless using a separate limited receiving system, the receiving system may include only the HOST (700).

The HOST (700) includes a first Tuner (702), a second Tuner (704), a demodulator (706), a multiplexer (708), a demultiplexer (710), a decoder (712), a Network interface unit (714), a Network unit (716), a parser (718), a controller (722), a DCAS (Downloadable CAS) unit (724), a DVR (Digital Video Recorder) controller (726), a contents encryptor (728), a storage interface unit (730), a storage unit (732), a displayer (734), and an interface unit (736).

The CableCARD (720) may correspond to a Single stream card that can process only a single stream, or the CableCARD (720) may correspond to a Multi stream card that can process multiple streams at the same time.

The digital broadcast receiver may be configured in an open cable format, wherein the CableCARD (720) including a Conditional Access (CA) system is separated from the main body. The CableCARD (720) may also be referred to as a POD (Point Of Deployment) module, which may be manufactured so as to be detachably fixed to a main body slot of the digital broadcast receiver. Also, the main body in which the CableCARD (720) may be inserted may also be referred to as a host. In this case, the CableCARD (720) and the HOST (700) are collectively referred to as a receiver.

A network connecting unit (701) performs the role of connecting the receiver to an external network. For example, the network connecting unit (701) may connect the receiver to an external IP network. For example, in case of using MoCA (Multimedia Over Coax Alliance), an IP-based network may be configured within a coaxial cable network, thereby being connected to the receiver. Alternatively, connection may be made with the external network by using the DOCSIS modem. Or, connections with the external network may be made by using a wireless relay unit enabling connection with a wireless internet network, or by using a wired relay unit enabling connection with a wired internet network, such as a wired ADSL relay unit. The connection to the external network is merely exemplary, and, therefore, details as to which type of connection means to use may vary depending upon the type of connection with the external network.

The first tuner (702) tunes only a specific channel frequency from one of a groundwave A/V (Audio/Video) being transmitted through an antenna or a cable A/V broadcast program being transmitted via In-band through a cable connected to the network connecting unit (701), thereby outputting the tuned specific channel frequency to the demodulator (706).

At this point, since the groundwave (or terrestrial) broadcasting and cable broadcasting use different transmission methods, the demodulation methods used in the demodulator (706) are also different. For example, the groundwave (or terrestrial) A/V broadcast programs are modulated in a VSB (Vestigial Sideband Modulation) method, thereby being transmitted. And, the cable A/V broadcast programs are modulated in a QAM (Quadrature Amplitude Modulation) method, thereby being transmitted. Therefore, when the channel frequency tuned by the first tuner (702) corresponds to a groundwave (or terrestrial) broadcast program, the demodulator (706) performs demodulation by using the VSB method, and when the channel frequency tuned by the first tuner (702) corresponds to a cable broadcast program, the demodulator (706) performs demodulation by using the QAM method.

The second tuner (704) tunes only a specific channel frequency from the cable A/V broadcast programs being transmitted via In-band through a cable connected to the network connecting unit (701), thereby outputting the tuned specific channel frequency to the demodulator (706).

The first tuner (702) and the second tuner (704) may tune signals of different channels, thereby transmitting the tuned signals to the demodulator (706). Alternatively, different A/V streams of the same channel as the first tuner (702) may be tuned, thereby being transmitted to the demodulator (706). For example, the first tuner (702) may tune the stream of a main picture, and the second tuner (704) may tune the stream of a PIP (Picture in Picture). Also, in case a digital video signal is stored by using a DVR (Digital Video Recorder), the first tuner (702) and the second tuner (704) may be used so as to watch (or view) the image and to watch & record the video signal at the same time.

The demodulator (706) demodulates the received signal and transmits the demodulated signal to the multiplexer (708). The multiplexer (708) may multiplex the signal inputted from the demodulator (706) and the parser (718), thereby outputting the multiplexed signal. For example, the main image tuned by the first tuner (702) and then demodulated and the PIP image tuned by the second tuner (704) and then demodulated are multiplexed, thereby being outputted. Alternatively, depending upon the embodiment of the digital broadcast receiver, an image of a different channel may be multiplexed, or the images may be multiplexed with a signal outputted from the parser (718), thereby being outputted.

When the signal being outputted from the multiplexer (708) corresponds to a groundwave broadcast signal, the inputted signal is outputted to the demultiplexer (710), so as to be outputted. And, when the signal being outputted from the multiplexer (708) corresponds to a cable broadcast or IPTV broadcast signal, the inputted signal is outputted to the demultiplexer (710) through the CableCARD (720) mounted on the slot. For preventing duplication of higher value-added broadcast contents and to enabling conditional access, the CableCARD (702) includes a Conditional Access (CA) system, which is also referred to as a POD (Point Of Deployment) module.

More specifically, when the received broadcast signal is scrambled, the CableCARD (720) descrambles the received signal, thereby outputting the processed signal to the demultiplexer (710). If the CableCARD (720) is not mounted, the A/V broadcast signal outputted from the multiplexer (708) is directly outputted to the demultiplexer (710). In this case, the scrambled A/V broadcast signal cannot be descrambled. Therefore, the A/V broadcast signal may not be viewed normally.

The demultiplexer (710) separates the inputted video signal and audio signal and outputs the separated signals to the decoder (712). The decoder (712) recovers the compressed A/V signal back to the initial signal through a video decoding algorithm and an audio decoding algorithm, respectively. Thereafter, the decoder (712) outputs the recovered signal to the displayer (734) for display.

A DVR controller (726), a contents encryptor (728), a storage interface unit (730), and a storage unit (732) perform the role of storing the received digital data or playing the stored data. In accordance with the control of the controller (722), the DVR controller (726) either stores the A/V contents selected from the data outputted from the demultiplexer (710) or controls the receiver so that the A/V contents selected from the stored data can be played. The contents encryptor (728) encrypts the data that are to be stored and then outputs the encrypted data, or recovers the encrypted and stored data and outputs the recovered data. Depending upon the embodiment of the digital broadcast receiver, the contents encryptor (728) may not be used.

The storage interface unit (730) performs a data input/output interface with the storage unit (732), and the storage unit (732) stores the inputted data.

The storage unit (732) may store a program for each of the signal processing and control within the controller (722), and may store A/V contents, and may store guide information on service information and broadcast services. Furthermore, separate data guide information may be stored in the storage unit (732), and a database for creating (or generating) a consolidated data guide listing may be configured from the separately stored data guide information.

The storage unit (732) may be configured as a single physical storage medium or may be configured as multiple storage media. In case the storage unit (732) is configured as multiple storage media, multiple storage interface units (730) may be configured. Also, the storage unit (732) may be implemented as at least one type of storage medium among a flash memory type, a hard disk type, a multimedia card micro type, a card-type memory (e.g., SD or XD memory, etc.), RAM, ROM (EEPROM, etc.).

The controller (722) controls the overall operations inside the HOST (700). The controller (722) may receive the signal transmitted from the remote controller (750) through the interface unit (736). The controller (722) processes the received signal and deciphers (or translates) the command inputted by the user to the remote controller (750), thereby controlling the HOST (700) with respect to the deciphered (or translated) result. For example, when the user inputs a predetermined channel selection command, the controller (722) controls the first tuner (702) or the second tuner (704), so that the selected channel can be received through the first tuner (702) or the second tuner (704). Also, the controller (722) controls the decoder (712) so that the video signal and audio signal of the selected channel can be processed. Furthermore, the controller (722) controls the decoder (712) so that the information on the channel selected by the user can be outputted through the displayer (734) along with the video signal and audio signal of the selected channel.

In another example, when the user inputs a source option selection command, the controller (722) controls the displayer (734) so that program schedule information of the source associated with the source option selected based upon the inputted source option selection command can be displayed on the display screen.

In another example, the user may input other types of video or audio output commands through the remote controller (750). More specifically, instead of a broadcast signal, the user may wish to view (or watch) a recorded program stored in the storage unit (732). In this case, the controller (722) may control the DVR controller (726) so that the recorded program can be played.

Apart from the command being inputted from the remote controller (750), the controller (722) determines the user command inputted to a user input unit (not shown), which is formed in the HOST (700), and the controller (722) may control the HOST (722) with respect to the determined user command. For example, the user may input an on/off command of the HOST (700), a channel change command, a volume change command, a source option selection command, a data providing source selection command, and so on, through the user input unit. Herein, the user input unit may be configured of a button or key formed in the HOST (700). The controller (722) determined whether or not the user input unit is operated (or maneuvered), so as to control the HOST (700) in accordance with the determined result.

Also, the controller (722) may execute the browser in order to process the received service. The browser may display service information on a display screen, and the controller (722) may also control the receiver so that the contents can be played. Additionally, the browser may execute applications and applications associated with the contents. Furthermore, the browser may process a web page provided by a server and may display the processed web page on the display screen. Herein, the service information may be provided in a web page format.

The DCAS unit (724) may download a Condition Access System (CAS) from the server of the transmitting end and store the downloaded CAS. Then, based upon the most appropriate Condition Access System among the stored Condition Access Systems, the DCAS unit (724) performs the condition access function. The controller (722) controls the interface between the HOST (700) and the CableCARD (720) and the data processing of the HOST (700).

Among the signals received through the network connection unit (701), the network interface unit (714) receives an Ethernet frame packet being transmitted to a specific IP address, thereby transmitting the received Ethernet frame packet to the network unit (716). More specifically, the network interface unit (702) receives an IP packet delivering broadcast data from a service providing server though the network. Herein, the broadcast data include contents, update messages notifying whether or not the contents are updated, metadata, guide information on a broadcast service, and software codes. Herein, the specific IP address may correspond to the IP address of the HOST itself or to the IP address of the CableCARD. Furthermore, the service providing server may correspond to a contents provider or a service provider.

Alternatively, the network interface unit (714) receives data according to the two-way communication (e.g., charged program viewing, status information of the receiver, user input, and so on) from the network unit (716), thereby transmitting the corresponding data to an external network through the network connecting unit (701).

In case of the receiver shown in FIG. 7, an IPTV broadcast signal according to an IP protocol, or a VOD (Video On Demand) signal, or an OOB (Out Of Band) message signal may be received through the network interface unit (714). In case of the conventional cable broadcast programs, an OOB message such as SI (System Information), EAS (Emergency Alert System), XAIT (extended Application Information Table), Condition Access (or limited reception) system information, and diverse CableCARD control information, is received by using a DSG (DOCSIS Settop Gateway) method or an OOB (Out Of Band) method.

In case of the receiver shown in FIG. 7, a DOCSIS modem or an OOB tuner may be equipped inside the HOST, thereby enabling the OOB message to be received. For example, one of the IP method and the OOB method may be used to receive the OOB message, or one of the IP method and DSG method and the OOB method may be used to receive the OOB message.

In case of receiving the OOB message by using one of the IP method and the OOB method, the receiver shown in FIG. 7 further requires an OOB modem and a demodulator. Alternatively, in case of receiving the GOB message by using one of the IP method and DSG method and the GOB method, the receiver shown in FIG. 7 further requires a switching unit for selecting a DOCSIS modem, an GOB modem, the DSG method and the GOB method, and a demodulator for transmitting data to a head-end in accordance with each method.

As described above, in case of using all of the IP method, the conventional DSG method, and the GOB method, or in case of using the IP method and the GOB method excluding the DSG method, the method that is to be used is decided by the transmitting end, thereby transmitting the decided information to the CableCARD (720). Then, depending upon the information decided from the transmitting end, the CableCARD (720) notifies the operation method to the HOST (700). In this case, the problem of backward compatibility may also be resolved.

For simplicity, in the description of the receiver shown in FIG. 7, a case of receiving guide information on a broadcast service and OOB messages through the network interface unit (714) using the IP, and not the DSG method using the DOCSIS modem or the OOB method using an OOB tuner, will be mainly described. In this case, the transmitting end should use an IP so as to packetize and transmit the guide information on a broadcast service and the OOB messages. In case of VODs or IPTV broadcasting, messages such as Condition Access (or limited reception) system information may be received in a packet format, such as a VOD packet or an IPTV broadcast packet.

The GOB message, which was given as an example in the above description, is merely exemplary. And, depending upon the embodiment of the present invention, in addition to the information given as an example in the above description, other required information may be added, or unnecessary information may be excluded from the exemplary information presented in the above description.

A network unit (716) uses a TCP/IP-based or UDP (User Datagram Protocol)/IP-based network stack so as to route the received packet to its destination. More specifically, the network unit (716) may support both the TCP/IP and the UDP/IP.

The network unit (716) routes the received VOD signal or IPTV broadcast signal to a parser (718). The parser (718) receives an MPEG (Moving Picture Expert Groups)-based TP packet included in an IP/UDP packet and parses the received MPEG (Moving Picture Expert Groups)-based TP packet, thereby outputting the parsed packet to the multiplexer (708). The procedure after the multiplexer (708) is the same as described above. In the example, it is assumed that the broadcast signal corresponds to an MPEG-based signal, and, therefore, the TP Packet is received and parsed. However, in case a broadcast signal using a different standard is received, another unit other than the TP packet unit may be used. Therefore, the scope and spirit of the present invention will not be limited to the terms set in the exemplary embodiment of the present invention.

The network unit (716) transmits a packet being targeted to the CableCARD (720) (i.e., the destination of the packet being the CableCARD (720)) to the CableCARD (720). As one of the packets targeted to the CableCARD (720), the GOB (Out Of Band) message is routed from the network unit (716), thereby being transmitted to the CableCARD (720). In case of routing the OOB message to the CableCARD (720), data may be transmitted to the CableCARD (720) through a second layer routing or a third layer routing.

The network unit (716) transmits a packet being targeted to the controller (722) (i.e., the destination of the packet being the controller (722)) to the controller (722). Guide information on the broadcast service, which may correspond to one of the packets being targeted to the controller (722), is routed from the network unit (716) so as to be transmitted to the controller (722). In case of routing the guide information on the broadcast service to the controller (722), data may be transmitted to the controller (722) through a second layer routing, a third layer routing, and a fourth layer routing. Herein, the fourth layer routing uses port information included in the TCP packet.

In case of using the second layer routing, routing is performed by using a MAC (Media Access Control) address system of the destination (or target) included in a header of a received Ethernet frame. In case of using the third layer routing, routing is performed by using an IP address system of the destination (or target) included in a header of a received Ethernet frame. Herein, whether to use the second layer routing or whether to use the third layer routing may be decided depending upon the exemplary embodiment of the present invention. More specifically, depending upon the exemplary embodiment of the present invention, either the second layer routing may be used, or the third layer routing may be used.

A Data Channel and an Extended Channel exist between the CableCARD (720) and the HOST (700). The Data Channel is set-up to transmit and receive control signals to and from the CableCARD (720) and the HOST (700). And, the Extended Channel is a channel set-up so as to actually transmit and receive data to and from the CableCARD (720) and the HOST (700). The Extended Channel corresponds to a CPU interface defined so that the data can be transmitted and received to and from the CableCARD (720) and the HOST (700).

More specifically, the CableCARD (720) communicates with the transmitting end so as to translate the command received from the transmitting end. Thereafter, the CableCARD (720) communicates with the HOST through the Data Channel and the Extended Channel, so as to either perform the instructions given by the transmitting end or to perform the role of delivering the details inputted by the user to the transmitting end.

At this point, in order to transmit data through the Extended Channel, a transmission path corresponding to the data type defined between the CableCARD (720) and the HOST (700) should first be determined. This is referred to as a flow. For example, in order to transmit MPEG section data, an MPEG section flow should first be set-up between the CableCARD (720) and the HOST (700). Then, actual MPEG section data may be transmitted via the corresponding flow.

The flow of the Extended Channel includes an IP Unicast (IP_U) flow, an IP Multicast (IP_M) flow, and a maximum of 6 MPEG section flows. If an embedded DOCSIS modem is included within the HOST, as shown in FIG. 7, the flow of the Extended Channel further included a DSG flow in order to transmit the OOB message received through the DOCSIS modem to the CableCARD.

The OOB message packet received through the network interface unit (714) may be transmitted to the CableCARD by an IP address-based routing process. The routing to the target IP address is performed through the network unit (716). Other packets used in each application of the HOST (700) are routed to the respective application. For example, applications within the HOST (700) may include an MC (Multicasting) application, a NAV (Navigation) application, and so on.

In case data are transmitted to the CableCARD (720) from the HOST (700), either the IP_U flow or the IP_M flow may be used. And, in case data are transmitted to the HOST (700) from the CableCARD (720), the IP_U flow may be used. The data received by the CableCARD (720) through the flow is re-routed, so as to be transmitted to a respective application within the CableCARD. For example, applications within the CableCARD may include a CA (Conditional Access) application, an MC application, an RPT (IPPV (Impulse Pay Per View) Report back function) application, and so on.

Among the data being received by the CableCARD (720), the MPEG section data apart from the data being used only by the CableCARD (720) are filtered, so as to be routed to the respective applications within the HOST (700) through the MPEG section flow. For example, the MPEG section data may include SI, EAS, XAIT data, and so on. The CableCARD (720) extracts the MPEG section data from the received data. Then, the CableCARD (720) configures the MPEG section data fragments into a complete set of MPEG section data, thereby transmitted the completely configured MPEG section data to the HOST (700) through the MPEG section flow.

Among the above-described flows, the IP_U flow transmits data received by the HOST (700) via the Unicast method to the CableCARD (720) and has a two-way (or bi-directional) characteristic between the HOST (700) and the CableCARD (720). The IP_M flow transmits data received by the HOST (700) via the Multicast method to the CableCARD (720). Herein, the IP_M flow has a one-way (or uni-directional) characteristic of the CableCARD (720).

When the above-described OOB message is received through a data transmission and reception between the CableCARD (720) and a headend of the transmitting end, the Unicast method may be used. As described above, when the Unicast method is used to transmit and receive the OOB message, the OOB message received by the HOST (700) may be transmitted to the CableCARD (720) through the IP_U flow.

The network unit (716) receives an Ethernet frame packet and routes the received Ethernet frame packet to a target address of the packet. At this point, in case of receiving the above-described OOB message according to the Unicast method and of routing the received OOB message to the CableCARD (720), the OOB message may be routed to the CableCARD (720) through the IP_U flow.

As described above, the HOST (700) may use the second layer routing or the third layer routing so as to route the OOB message to the CableCARD (720). In the CableCARD (720), a specific MAC address and IP address are pre-determined. In case of the second layer routing, a target MAC address included in an Ethernet header portion of the Ethernet frame transmits the data set as the MAC Address of the CableCARD to the CableCARD (720). In case of the third layer routing, a target IP address included in an IP header portion of the Ethernet frame transmits the data set as the IP Address of the CableCARD to the CableCARD (720).

However, in case of the IP_U flow, an IP packet is transmitted. The IP packet includes a 20-byte IP header unit, an 8-byte UDP header unit, and a UDP payload unit. Similarly, in case of transmitting data according to the TCP protocol and not the UDP protocol, a TCP header unit and a TCP payload unit are included instead of the UDP header unit and the UDP payload unit.

Therefore, in case of using the second layer routing, or in case of using the third layer routing, data having an IP packet format, wherein the Ethernet header unit and an Ethernet CRC unit are removed from the Ethernet frame packet, are transmitted to the CableCARD (720). Depending upon the data types, the IP packet may be divided into a broadcast data packet including MPEG sections, and a CA data packet including information on Condition Access (or limited reception).

FIG. 8 illustrates an exemplary guide information displayed on a screen according to the present invention.

Referring to FIG. 8, a displayer (734) displays a first screen region (810) including at least one source option associated with a source on a display screen. Herein, the source refers to a transmission medium transmitting broadcast data, and the source may include groundwave (or terrestrial), cable, satellite, and internet wires (or lines). More specifically, each source option included in the first screen region (810) may be associated with any one of the groundwave (or terrestrial), cable, satellite, and internet line (or wire).

The source option included in the first screen region (810) is toggled according to a source option selection command. More specifically, the user may toggle a source option included in the first screen region (810) so as to select a specific source option.

Also, the first screen region (810) further includes a source mark indicating the source. The source mark may indicate a source associated with the source option selected in accordance with the source option selection command. More specifically, when a source option associated with the satellite is toggled to a source option associated with an internet line, so that a source option associated with an internet line can be selected, the source mark indicates the internet line. Herein, the user may input the user command by using a device such as a remote controller (750). For example, the user may position an indicator in the first screen region (810) and may click a button on the remote controller (750), so as to input the user command.

In case the source option included in the first screen region (810) in accordance with the source option selection command is toggled, thereby allowing a specific source option to be selected, the displayer (734) displays a second screen region (820) on the display screen, the second screen region (820) including guide information on a broadcast service being transmitted through a source associated with the selected source option. Herein, the guide information on the broadcast service may include program schedule information including a time concept and contents guide information that does not include any time concept. Also, the guide information on the broadcast service may include the Contents Guide information described in FIG. 2.

Also, in case the second screen region includes program schedule information, the displayer (734) may display a time region (830) on a display screen. The time region (830) corresponds to a screen region for guiding the broadcast service.

The source mark of the first screen region indicates 'CP', which signifies the internet line source. More specifically, the first screen region indicates that a source option associated with the internet line is selected from the current source option. Also, the second screen region (820) displays guide information on a broadcast service being provided through the internet line. YAHOO, NETFLIX, YOUTUBE, AND VUDU, which are displayed in the first line, correspond to the data providing source providing broadcast programs. By using an arrow (821) and another arrow (822), the user may verify additional data providing sources. More specifically, in case the user clicks on an arrow (821) by using the remote controller (750), the displayer (734) displays the data providing source located on the left side of NETFLIX. Also, in case the user clicks on an arrow (821) by using the remote controller (750), the displayer (734) displays the data providing source located on the right side of VUDU.

Starting from the second line of the second screen region (820), guide information on the program being provided by each data providing source is displayed. Herein, the guide information being displayed on the second screen region (820) corresponds to broadcast schedule information. And, accordingly, the time region (830) for guiding the broadcasting time is displayed. Also, the guide information on the program may correspond to the program title.

It can be known from the second screen region (820) and the third screen region (830) that NETFLIX shows program AAA at 8 o'clock, program BBB at 9 o'clock, and program CCC at 10 o'clock. Also, it can be known from the second screen region (820) and the third screen region (830) that YAHOO shows program DDD from 8 o'clock to 10 o'clock and program B'BB at 10 o'clock. Additionally, it can be known from the second screen region (820) and the third screen region (830) that YOUTUBE shows program B'BB at 8 o'clock, program A'AA at 9 o'clock, and program C'CC at 10 o'clock. Finally, it can be known from the second screen region (820) and the third screen region (830) that VUDU shows program AA'A at 8 o'clock, program C"CC at 9 o'clock, and program B'B'B at 10 o'clock.

By using an arrow (831) of the third screen region (830), the user may verify the program of each data providing source being shown at other time schedules. More specifically, in case the user uses the remote controller (750) to click the arrow (831), the displayer (734) may display the time schedule after 10 o'clock on the third screen region (830). And, the displayer (734) may also display guide information on the program of each data providing source being shown at each time schedule on the corresponding portion of the second screen region (820). Also, although it is not shown on the screen, in case guide information on a program being shown at a time schedule earlier than 8 o'clock exists, the third screen region (830) may display an arrow being used for displaying a time schedule earlier than 8 o'clock in the third screen region (830).

FIG. 9 illustrates another exemplary guide information displayed on a screen according to the present invention.

Referring to FIG. 9, the source mark of a first screen region (910) indicates 'AIR' signifying the groundwave (or terrestrial) source. Also, 7-1, 8-1, 9-1, and 11-1 marked in the first line of a second screen region (920) correspond to broadcast channels. Also, by using an arrow (921) and another arrow (922), the user may display a broadcast channel that is currently not being displayed.

Starting from the second line of the second screen region (920), guide information on the program being provided by each data providing source is displayed. Herein, the guide information being displayed on the second screen region (920) corresponds to broadcast schedule information. And, accordingly, a time region (930) for guiding the broadcasting time is displayed. Also, the guide information on the program may correspond to the program title.

It can be known from the second screen region (920) and the third screen region (930) that broadcast channel 7-1 shows the program Carton at 8 o'clock, the program Flower at 9 o'clock, and the News program at 10 o'clock. Also, it can be known from the second screen region (920) and the third screen region (930) that broadcast channel 8-1 shows the program Love Actually from 8 o'clock to 10 o'clock and the program Rabbit at 10 o'clock. Additionally, it can be known from the second screen region (920) and the third screen region (930) that broadcast channel 9-1 shows the MBC News program at 8 o'clock, the program Sole at 9 o'clock, and the program Friends at 10 o'clock. Finally, it can be known from the second screen region (920) and the third screen region (930) that broadcast channel 11-1 shows the program BiBiBo at 8 o'clock, the program Style at 9 o'clock, and the program Queen at 10 o'clock.

By using an arrow (931) of the third screen region (930), the user may verify the program of each broadcast channel being shown at other time schedules. More specifically, in case the user uses the remote controller (750) to click the arrow (931), the displayer (734) may display the time schedule after 10 o'clock on the third screen region (930). And, the displayer (734) may also display guide information on the program of each broadcast channel being shown at each time schedule on the corresponding portion of the second screen region (920). Also, although it is not shown on the screen, in case guide information on a program being shown at a time schedule earlier than 8 o'clock exists, the third screen region (930) may display an arrow being used for displaying a time schedule earlier than 8:00 in the third screen region (930).

FIG. 10 illustrates yet another an exemplary guide information displayed on a screen according to the present invention.

Referring to FIG. 10, the source mark of a first screen region (1010) indicates 'CAB' signifying the cable source. Also, 20-1, 30-1, 40-1, and 50-1 marked in the first line of a second screen region (1020) correspond to cable broadcast channels. Also, by using an arrow (1021) and another arrow (1022), the user may display a cable broadcast channel that is currently not being displayed.

Starting from the second line of the second screen region (1020), guide information on the program being provided by each data providing source is displayed. Herein, the guide information being displayed on the second screen region (1020) corresponds to broadcast schedule information. And, accordingly, a time region (1030) for guiding the broadcasting time is displayed. Also, the guide information on the program may correspond to the program title.

It can be known from the second screen region (1020) and the third screen region (1030) that broadcast channel 20-1 shows the program Math(Sta.) at 8 o'clock, the program Eng.(Verb) at 9 o'clock, and the program Q&A at 10 o'clock. Also, it can be known from the second screen region (1020) and the third screen region (1030) that broadcast channel 30-1 shows the program Romantic Holiday from 8 o'clock to 10 o'clock and the program Innocent at 10 o'clock. Additionally, it can be known from the second screen region (1020) and the third screen region (1030) that broadcast channel 40-1 shows the program Propose at 8 o'clock, the program Nine at 9 o'clock, and the program Rain at 10 o'clock. Finally, it can be known from the second screen region (1020) and the third screen region (1030) that broadcast channel 50-1 shows the program Friends(1) at 8 o'clock, the program Friends(2) at 9 o'clock, and the program Friends(3) at 10 o'clock.

By using an arrow (1031) of the third screen region (1030), the user may verify the program of each broadcast channel source being shown at other time schedules. More specifically, in case the user uses the remote controller (750) to click the arrow (1031), the displayer (734) may display the time schedule after 10 o'clock on the third screen region (1030). And, the displayer (734) may also display guide information on the program of each broadcast channel being shown at each time schedule on the corresponding portion of the second screen region (1020). Also, although it is not shown on the screen, in case guide information on a program being shown at a time schedule earlier than 8 o'clock exists, the third screen region (1030) may display an arrow being used for displaying a time schedule earlier than 8:00 in the third screen region (1030).

FIG. 11 illustrates yet another an exemplary guide information displayed on a screen according to the present invention.

Referring to FIG. 11, the source mark of a first screen region (1110) indicates 'SAT' signifying the satellite source. Also, 20-1, 30-1, 40-1, and 50-1 marked in the first line of a second screen region (1120) correspond to broadcast channels being provided through a satellite network. Also, by using an arrow (1121) and another arrow (1122), the user may display a satellite broadcast channel that is currently not being displayed.

Starting from the second line of the second screen region (1120), guide information on the program being provided by each data providing source is displayed. Herein, the guide information being displayed on the second screen region (1120) corresponds to broadcast schedule information. And, accordingly, a time region (1130) for guiding the broadcasting time is displayed. Also, the guide information on the program may correspond to the program title.

It can be known from the second screen region (1120) and the third screen region (1130) that broadcast channel 20-1 shows the program Math(Sta.) at 8 o'clock, the program Eng.(Verb) at 9 o'clock, and the program Q&A at 10 o'clock. Also, it can be known from the second screen region (1120) and the third screen region (1130) that broadcast channel 30-1 shows the program Romantic Holiday from 8 o'clock to 10 o'clock and the program Innocent at 10 o'clock. Additionally, it can be known from the second screen region (1120) and the third screen region (1130) that broadcast channel 40-1 shows the program Propose at 8 o'clock, the program Nine at 9 o'clock, and the program Rain at 10 o'clock. Finally, it can be known from the second screen region (1120) and the third screen region (1130) that broadcast channel 50-1 shows the program Friends(1) at 8 o'clock, the program Friends(2) at 9 o'clock, and the program Friends(3) at 10 o'clock.

By using an arrow (1131) of the third screen region (1130), the user may verify the program of each broadcast channel source being shown at other time schedules. More specifically, in case the user uses the remote controller (750) to click the arrow (1131), the displayer (734) may display the time schedule after 10 o'clock on the third screen region (1130). And, the displayer (734) may also display guide information on the program of each broadcast channel being shown at each time schedule on the corresponding portion of the second screen region (1120). Also, although it is not shown on the screen, in case guide information on a program being shown at a time schedule earlier than 8 o'clock exists, the third screen region (1130) may display an arrow being used for displaying a time schedule earlier than 8:00 in the third screen region (1130).

FIG. 12 illustrates yet another an exemplary guide information displayed on a screen according to the present invention.

Referring to FIG. 12, the source mark of the first screen region (1210) indicates 'CP', which signifies the internet line source. Also, YAHOO, NETFLIX, YOUTUBE, AND VUDU, which are displayed in the first line of a second screen region (1220), correspond to the data providing source that can be accessed through an internet line. Also, by using an arrow (1221) and another arrow (1222), the user may verify a data providing source that is currently not being displayed.

Starting from the second line of the second screen region (1220), guide information on the program being provided by each data providing source is displayed. Herein, the guide information being displayed on the second screen region (1220) corresponds to contents guide information that does not include any concept of time. Therefore, instead of displaying a time region for displaying a broadcasting time schedule, a selection region (1230) for displaying guide information that is currently not displayed on the display screen. The selection region (1230) includes an arrow (1231) and another arrow (1232). And, the guide information on the program may correspond to the name of the broadcast service. Also, when the user clicks the guide information on each broadcast service, the displayer (734) may display a lower-level menu of the corresponding service, or the controller (722) may control the system so that a request on a broadcast service can be transmitted to a respective data providing source.

It can be known from a second screen region (1220) that NETFLIX provides VOD (Video on Demand) services, Music services, and TV on demand services. Also, it can be known from the second screen region (1220) that YAHOO provides VOD services, Weather services, and Search services. Additionally, it can be known from the second screen region (1220) that YOUTUBE provides UCC (User Created Contents) services, Music services, and Search services. Furthermore, it can be known from the second screen region (1220) that VUDU provides VOD services, TV on demand services, and Search services.

By clicking an arrow (1231) of the selection region (1230), the user may enable guide information located on an upper portion of the upper-level line to be displayed. Also, the user may click on the other arrow (1232) of the selection region (1232), so as to enable guide information located on a lower portion of the lower-level line to be displayed.

Figure 13:
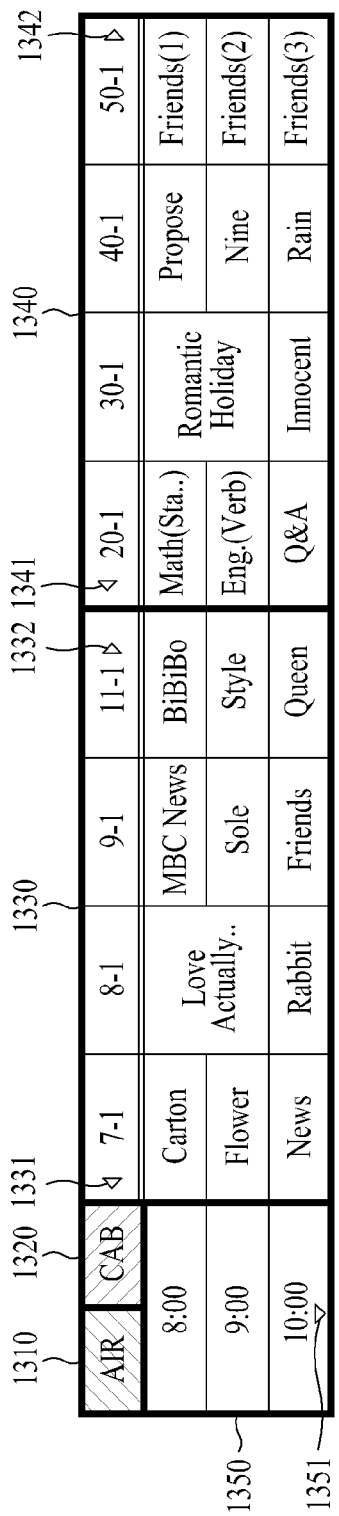
FIG. 13 illustrates yet another an exemplary guide information displayed on a screen according to the present invention.

FIG. 13 illustrates yet another an exemplary guide information displayed on a screen according to the present invention.

Referring to FIG. 13, a first screen region includes a first source region (1310) and a second source region (1320). Herein, each of the first source region (1310) and the second source region (1320) includes at least one source option associated with the source. Also, the source option included in each of the first source region (1310) and the second source region (1320) is toggled in accordance with a source option selection command. More specifically, the user may toggle the source option included in the source region (1310) so as to select a specific source option.

Also, each of the first source region (1310) and the second source region (1320) may further include a source mark indicating the source. The source mark may indicate the source associated with the source option selected in accordance with the source option selection command.

The second screen region may include a first guide information region (1330) and a second guide information region (1340). In case a source option included in the first source region (1310) is toggled so that a specific source option can be selected according to a source option selection command, the displayer (734) may display guide information of a broadcast service being transmitted through a source associated with the selected source option in the first guide information region (1330). Also, in case a source option included in the second source region (1320) is toggled so that a specific source option can be selected according to a source option selection command, the displayer (734) may display guide information of a broadcast service being transmitted through a source associated with the selected source option in the second guide information region (1340).

The source mark of the first source region (1310) indicates 'AIR', which signifies the groundwave (or terrestrial) source. Accordingly, the first guide information region (1330) of the second screen region includes guide information on the broadcast service being provided via groundwave. Also, the source mark of the second source region (1320) indicates 'CAB', which signifies the cable source. Accordingly, the second guide information region (1340) of the second screen region includes guide information on the broadcast service being provided via cable.

By using an arrow (1331) and another arrow (1332) of the first guide information region (1330), the user may verify a groundwave broadcast channel that is currently not being displayed. Similarly, by using an arrow (1341) and another arrow (1342) of the guide information region (1340), the user may verify a cable broadcast channel that is currently not being displayed.

By using an arrow (1351) of the third screen region (1350), the user may verify the program of each broadcast channel source being shown at other time schedules. More specifically, in case the user uses the remote controller (750) to click the arrow (1351), the displayer (734) may display the time schedule after 10 o'clock on the third screen region (1350). And, the displayer (734) may also display guide information on the program of each broadcast channel being shown at each time schedule on the corresponding portion of the first guide information region (1330) and the second guide information region (1340) of the second screen region. Also, although it is not shown on the screen, in case guide information on a program being shown at a time schedule earlier than 8 o'clock exists, an arrow being used for displaying the third screen region (1350) may be added.

Figure 14:
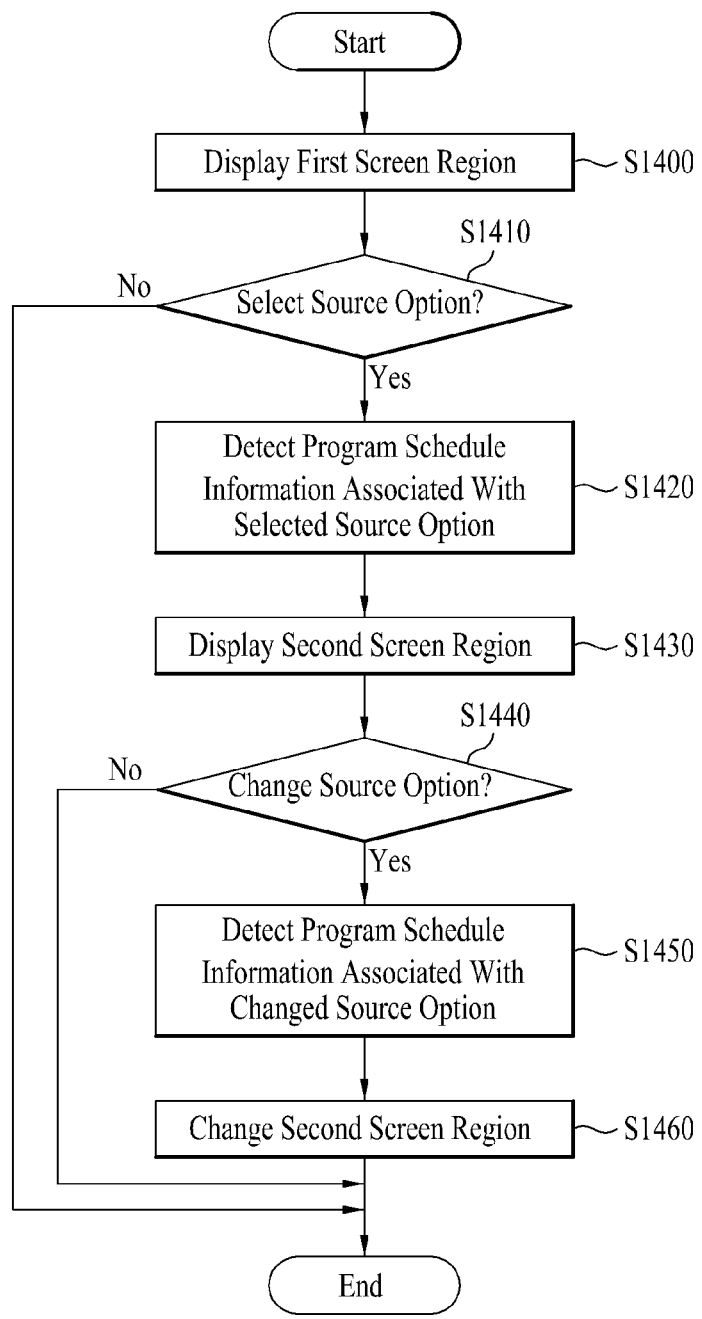
FIG. 14 illustrates process steps of a program guide providing invention according to a preferred embodiment of the present invention, and, FIG. 15 illustrates exemplary process steps of a method for providing a consolidated guide information listing according to a preferred embodiment of the present invention.

FIG. 14 illustrates process steps of a program guide providing invention according to a preferred embodiment of the present invention.

Referring to FIG. 14, the displayer (734) displays the first screen region (S1400). Herein, the first screen region may include at least one source option associated with the source. Also, the source refers to a transmission medium transmitting broadcast data, and the broadcast receiver may receive guide information on the broadcast service being provided through each source.

For example, the source may correspond to any one of groundwave, cable, satellite, and internet line (or wire). More specifically, each source option included in the first screen region (810) may be associated with any one of the groundwave, cable, satellite, and internet line. Also, in Step 1400, the first screen region being displayed on the display screen may correspond to the first screen region shown in FIG. 8 to FIG. 13.

The controller (722) verifies whether or not a source option selection command is inputted (S1410). Herein, the user uses the remote controller (750), so as to input a source option selection command by clicking on the first screen region. Also, in accordance with the source option selection command, the source option included in the first screen region is toggled, thereby enabling a specific source option to be selected.

In case the source option selection command is inputted, the controller (722) detects program schedule information of the source associated with the selected source option (S1420). Herein, the program schedule information may correspond to the information stored in the storage unit (700) and may correspond to the information detected from the broadcast data received from the source.

The displayer (734) displays the second screen region (S1430). Herein, the second screen region includes program schedule information associated with the selected source option. The program schedule information associated with the selected source option may correspond to the program schedule information of the source associated with the detected source option in Step 1420. Herein, also, the second screen region being displayed on the display screen may correspond to the second screen region shown in FIG. 8 to FIG. 13.

The controller (722) verifies whether or not the source option is changed (S1440). Herein, in case a source option selection command is inputted so that the source option included in the first screen region can be toggled, the controller (722) may verify that the source option is changed.

In case the source option is changed, the controller (722) detects program schedule information of the source associated with the changed source option (S1450). Herein, the program schedule information may correspond to the information stored in the storage unit (700) or may correspond to the information detected from the broadcast data being transmitted through the source. Also, the program schedule information may be transmitted through the corresponding source, or may be transmitted through another source.

The displayer (734) changes the second screen region and displays the changed screen region (S1460). Herein, the second screen region includes program schedule information associated with the changed source. The program schedule information associated with the changed source may correspond to the program schedule information associated with the source option detected in Step 1450. Furthermore, the second screen region being displayed on the display screen may correspond to the second screen region shown in FIG. 8 to FIG. 13.

Figure 15:
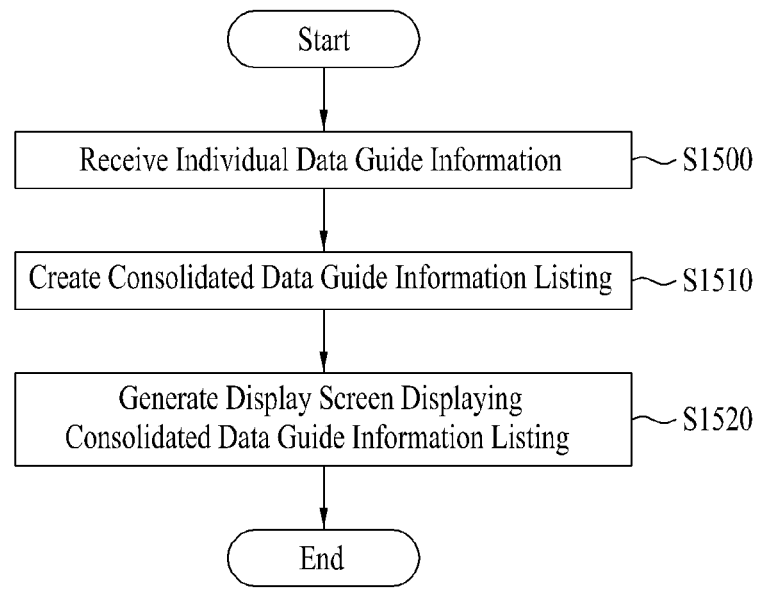

FIG. 15 illustrates exemplary process steps of a method for providing a consolidated guide information listing according to a preferred embodiment of the present invention.

Referring to FIG. 15, the receiver receives individual data guide information from an information source (S1500). Herein, there may be only one information source or multiple information sources. The receiver may correspond to the first tuner (702), the second tuner (704), and the network interface unit (714). The information source corresponds to a server providing guide information on the broadcast services. The information source may correspond to a multi-service provider, or a broadcaster and application provider described with reference to FIG. 1. And, the information source may also correspond to the contents guide information server and the service provider described with to FIG. 2. Herein, the multi-service provider may include at least one of YAHOO, NETFLIX, YOUTUBE, AND VUDU.

Also, as the guide information on the broadcast service being provided through a specific source, the individual data guide information includes contents guide information, EPG metadata, and BCG metadata. Also, the individual data guide information may be transmitted through at least one of cable, groundwave, satellite, and internet line.

Furthermore, the individual data guide information may be transmitted in diverse formats for each source type being transmitted. For example, in case the information is transmitted via groundwave, the individual data guide information may be transmitted to a PSIP (Program and System Information Protocol) Table. Also, in case the information is transmitted via cable, the individual guide information may be transmitted in a Java scripter format through an OOB channel, or the individual guide information may be transmitted to a PSIP (Program and System Information Protocol) Table included in the data stream through an In-band channel. Finally, in case the information is transmitted via an internet line, the individual data guide information may be transmitted in a web page format defined by XML.

Additionally, the controller (722) may control the digital broadcast receiver, so that the individual data guide information can be selectively (or optionally) received in accordance with the usage habits of the user. For example, in case the user obtains weather information services mainly from YAHOO, the controller (722) may correlate the weather service with YAHOO, so as to store the corresponding information in a user usage habit information list (or listing). Then, when the controller (722) receives the individual data guide information, based upon the user usage habit information listing, the controller (722) verifies that the user receives weather services from YAHOO. Thereafter, the controller (722) controls the receiver so that guide information on the weather service can be received from YAHOO.

The controller (722) combines the individual data guide information, so as to create a consolidated data guide information listing (S1510). Herein, the consolidated data guide information listing may include a program list for each least two or more data providing sources.

As an example of a method for combining the received individual data guide information, the controller (722) may extract information included in each of the received individual data guide information, thereby storing the extracted information in a respective table of the database configured in the storage unit (732). Also, the controller (722) generates a consolidated virtual table that can consolidate and provide data existing in each table. Then, the controller (722) may query the corresponding information from the consolidated virtual table, thereby being capable of configuring a consolidated data guide information listing.

Furthermore, the controller (722) may create the consolidated data guide information listing in the form of a web page. In this case, the controller (722) executes a browser, thereby enabling the executed browser to generate a bitstream for displaying the consolidated data guide information, which is converted to a web page format, on the display screen. Finally, the controller (722) executes a Java application, thereby enabling the executed Java application to generate a bitstream for displaying a user interface providing the consolidated data guide information on the display screen.

The displayer (734) generates a screen displaying the consolidated data guide information listing outputted from the controller (722) (S1520). Herein, the displayer (734) receives the bitstream generated from the controller (722), thereby being capable of generating a screen displaying the consolidated data guide information listing based upon the received bitstream. Furthermore, the displayer (734) may display only a portion of the consolidated data guide information listing on the display screen. As shown in display screen of FIG. 8 to FIG. 13, a display screen displaying a portion of the consolidated data guide information listing may be displayed.

The user may input a data providing source selection command through the remote controller (750), thereby being capable of selecting a specific data providing source from the displayed consolidated data guide information listing. In case a data providing source selection command is inputted, the controller (722) receives a broadcast service included in the program list of the data providing source selected from the selected data providing source. Herein, in case multiple broadcast services are included in the program list, the broadcast service associated with the inputted data providing source selection command may be received. More specifically, in case the user clicks on a broadcast service included in the program list, the controller (722) receives the data providing source command, and the controller (722) may receive the clicked broadcast service from a selected data providing source.

The present invention may be implemented in a computer-readable recording medium as a code that can be read by a computer. The computer-readable recording medium includes all types of recording medium storing data that can be read by computer device. Examples of the computer-readable recording medium may include ROM, RAM, CD-ROM, magnetic tape, floppy disk, optical data storage device, and so on. Also, the computer-readable recording medium may be implemented in the form of a carrier wave (e.g., transmission via Internet). Furthermore, the computer-readable recording medium may be dispersed (or scattered) to the computer device, which is connected to the recording device via network, thereby enabling a code that can be read by the computer device using a scatter method to be stored and executed.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

What is claimed is:

1. A method for providing a consolidated data guide information listing, the method comprising:
tuning to a broadcast signal from a first data providing source, the broadcast signal including broadcast data guide information;
demodulating the tuned broadcast signal;
receiving an Internet Protocol (IP) packet from a second data providing source, the IP packet including network data guide information, the IP packet being transmitted through the Internet;
parsing the received IP packet to extract the network data guide information;
multiplexing the demodulated broadcast signal and the extracted network data guide information so that the broadcast data guide information included in the broadcast signal and the extracted network data guide information are combined to form a consolidated data guide information listing;
demultiplexing the multiplexed broadcast signal and the consolidated individual data guide information;
providing the consolidated data guide information listing to a displayer; and
generating a display of at least a portion of the consolidated data guide information listing,
wherein the consolidated data guide simultaneously displays:
a first screen region including a first source region displaying a first source mark, and a second source region displaying a second source mark,
a second screen region including a plurality of first broadcast channel regions displaying respective broadcast channels associated with the first source mark, a plurality of second broadcast channel regions displaying respective broadcast channels associated with the second source mark, a plurality of first guide information regions displaying respective program titles associated with the first source mark, and a plurality of second guide information regions displaying respective program titles associated with the second source mark, and
a third screen region including a plurality of broadcasting time regions displaying respective broadcasting times,
wherein only when the first source mark is selected by a remote controller, respective broadcast channels associated with the first source mark are displayed in the plurality of first broadcast channel regions, and respective program titles associated with the first source mark are displayed in the plurality of first guide information regions,
wherein only when the second source mark is selected by the remote controller, respective broadcast channels associated with the second source mark are displayed in the plurality of second broadcast channel regions, and respective program titles associated with the second source mark are displayed in the plurality of second guide information regions,
wherein when the first source mark is selected by the remote controller, respective broadcast channels associated with the first source mark are displayed between the first source region displaying the first source mark and the plurality of second broadcast channel regions displaying respective broadcast channels associated with the second source mark, and
wherein when the second source mark is selected by the remote controller, respective broadcast channels associated with the second source mark are displayed next to the plurality of first broadcast channel regions displaying respective broadcast channels associated with the first source mark.

2. The method of claim 1, wherein the second data providing source is a multi service provider.

3. The method of claim 2, wherein the multi service provider includes at least one of YAHOO, NETFLIX, YOUTUBE, and VUDU.

4. The method of claim 1, further comprising:
receiving a user control command selecting a specific data providing source.

5. The method of claim 1, further comprising:
receiving one of the broadcast data guide information and the network data guide information based upon a user service-usage habit.

6. A device for providing a consolidated data guide information listing, the device comprising:
a tuner configured to tune to a broadcast signal from a first data providing source, the broadcast signal including broadcast data guide information;
a demodulator configured to demodulate the tuned broadcast signal;
a network interface unit configured to receive an Internet Protocol (IP) packet from a second data providing source, the IP packet including network data guide information, the IP packet being transmitted through the Internet;
a parser configured to parse the received IP packet to extract the network data guide information;
a multiplexer configured to multiplex the demodulated broadcast signal and the extracted network data guide information so that the broadcast data guide information included in the broadcast signal and the extracted network data guide information are combined to form a consolidated data guide information listing;
a demultiplexer configured to demultiplex and output the multiplexed broadcast signal and the consolidated individual data guide information; and
a displayer configured to generate a display of at least a portion of the consolidated data guide information listing output from the demultiplexer,
wherein the consolidated data guide simultaneously displays:
a first screen region including a first source region displaying a first source mark, and a second source region displaying a second source mark,
a second screen region including a plurality of first broadcast channel regions displaying respective broadcast channels associated with the first source mark, a plurality of second broadcast channel regions displaying respective broadcast channels associated with the second source mark, a plurality of first guide information regions displaying respective program titles associated with the first source mark, and a plurality of second guide information regions displaying respective program titles associated with the second source mark, and
a third screen region including a plurality of broadcasting time regions displaying respective broadcasting times,
wherein only when the first source mark is selected by a remote controller, respective broadcast channels associated with the first source mark are displayed in the plurality of first broadcast channel regions, and respective program titles associated with the first source mark are displayed in the plurality of first guide information regions,
wherein only when the second source mark is selected by the remote controller, respective broadcast channels associated with the second source mark are displayed in the plurality of second broadcast channel regions, and respective program titles associated with the second source mark are displayed in the plurality of second guide information regions, wherein when the first source mark is selected by the remote controller, respective broadcast channels associated with the first source mark are displayed between the first source region displaying the first source mark and the plurality of second broadcast channel regions displaying respective broadcast channels associated with the second source mark, and wherein when the second source mark is selected by the remote controller, respective broadcast channels associated with the second source mark are displayed next to the plurality of first broadcast channel regions displaying respective broadcast channels associated with the first source mark.

7. The device of claim 6, wherein the second data providing source is a multi service provider.

8. The device of claim 7, wherein the multi service provider includes at least one of YAHOO, NETFLIX, YOUTUBE, and VUDU.

9. The device of claim 6, further comprising a controller that receives a user control command selecting a specific data providing source.

10. The device of claim 6, further comprising a controller that receives one of the broadcast data guide information and the network data guide information based upon a user service-usage habit.

11. The device of claim 6, wherein the generated display includes at least one source option associated with a source for which individual data guide information is available.

12. A method for providing a consolidated data guide information listing, the method comprising:
   providing a consolidated data guide information listing to a displayer; and
   generating a display of at least a portion of the consolidated data guide information listing,
   wherein the consolidated data guide simultaneously displays:
   a first screen region including a first source region displaying a first source mark, and a second source region displaying a second source mark,
   a second screen region including a plurality of first broadcast channel regions displaying respective broadcast channels associated with the first source mark, a plurality of second broadcast channel regions displaying respective broadcast channels associated with the second source mark, a plurality of first guide information regions displaying respective program titles associated with the first source mark, and a plurality of second guide information regions displaying respective program titles associated with the second source mark, and
   a third screen region including a plurality of broadcasting time regions displaying respective broadcasting times, wherein only when the first source mark is selected by a remote controller, respective broadcast channels associated with the first source mark are displayed in the plurality of first broadcast channel regions, and respective program titles associated with the first source mark are displayed in the plurality of first guide information regions, wherein only when the second source mark is selected by the remote controller, respective broadcast channels associated with the second source mark are displayed in the plurality of second broadcast channel regions, and respective program titles associated with the second source mark are displayed in the plurality of second guide information regions, wherein when the first source mark is selected by the remote controller, respective broadcast channels associated with the first source mark are displayed between the first source region displaying the first source mark and the plurality of second broadcast channel regions displaying respective broadcast channels associated with the second source mark, and wherein when the second source mark is selected by the remote controller, respective broadcast channels associated with the second source mark are displayed next to the plurality of first broadcast channel regions displaying respective broadcast channels associated with the first source mark.

13. The method of claim 12, further comprising:
   tuning to a broadcast signal from a first data providing source, the broadcast signal including broadcast data guide information;
   demodulating the tuned broadcast signal;
   receiving an Internet Protocol (IP) packet from a second data providing source, the IP packet including network data guide information, the IP packet being transmitted through the Internet;
   parsing the received IP packet to extract the network data guide information;
   multiplexing the demodulated broadcast signal and the extracted network data guide information so that the broadcast data guide information included in the broadcast signal and the extracted network data guide information are combined to form the consolidated data guide information listing; and
   demultiplexing the multiplexed broadcast signal and the consolidated individual data guide information.

14. The method of claim 13, wherein the second data providing source is a multi service provider.

* * * * *